United States Patent [19]

Akamatsu

[11] 4,218,646
[45] Aug. 19, 1980

[54] AC FEEDING APPARATUS AND ROTATING FIELD APPARATUS HAVING AC FEEDING APPARATUS

[75] Inventor: Masahiko Akamatsu, Amagasaki, Japan

[73] Assignee: Mitsubishi Denki Kabushiki Kaisha, Tokyo, Japan

[21] Appl. No.: 862,870

[22] Filed: Dec. 21, 1977

[30] Foreign Application Priority Data

Dec. 21, 1976 [JP] Japan ............................ 51-154586
Dec. 23, 1976 [JP] Japan ............................ 51-155915
Feb. 10, 1977 [JP] Japan ............................ 52-13739

[51] Int. Cl.² .................... H02P 9/26; H02M 7/00
[52] U.S. Cl. .................................... 322/72; 318/800; 363/69; 363/71
[58] Field of Search .............. 322/59, 17, 72, 73; 363/68, 69, 71; 318/138, 800–803; 310/179, 189

[56] References Cited

U.S. PATENT DOCUMENTS

| | | | |
|---|---|---|---|
| 3,659,168 | 4/1972 | Salihi et al. ........................ | 318/800 |
| 3,790,877 | 2/1974 | Bailey ................................. | 363/71 |
| 4,028,600 | 6/1977 | Blaschke et al. .................. | 318/803 |
| 4,129,818 | 12/1978 | Goto et al. ......................... | 322/73 X |
| 4,144,559 | 3/1979 | Okumura et al. ................. | 363/68 X |

OTHER PUBLICATIONS

Proc. IEE, vol. 116, No. 5, May, 1969, "Bridge Rectifiers with Double and Multiple Supply".

*Primary Examiner*—Robert J. Hickey
*Attorney, Agent, or Firm*—Oblon, Fisher, Spivak, McClelland & Maier

[57] ABSTRACT

An AC feeding apparatus which comprises a plurality of series solid state switch groups connected in parallel and with each series solid state switch group comprising N solid state switches connected in series. AC windings are provided for $n(n \geq 1)$ phase and $m(m \geq 2)$ independent groups of the windings are respectively connected to corresponding contacts of series connections of the solid state switches of the series switch groups. In the AC feeding apparatus, N solid state switches in each group and m groups of windings have the relation of $2m \geq N \geq (m+1)$ and at least two groups among m groups of the AC windings are excited with each phase difference of $\Delta\theta(\neq \pi)$ in the turn-on control of the solid state switches. The AC feeding apparatus can be adapted for use in a rotating field generator, a commutator motor or an AC motor apparatus.

5 Claims, 54 Drawing Figures

FIG. 1
(a) PRIOR ART
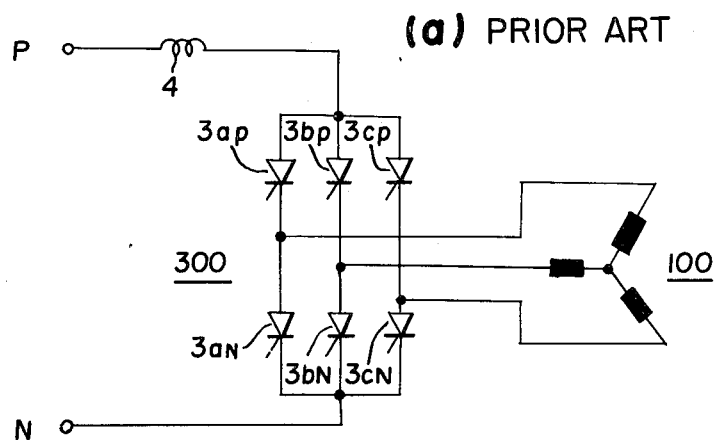
(b) PRIOR ART
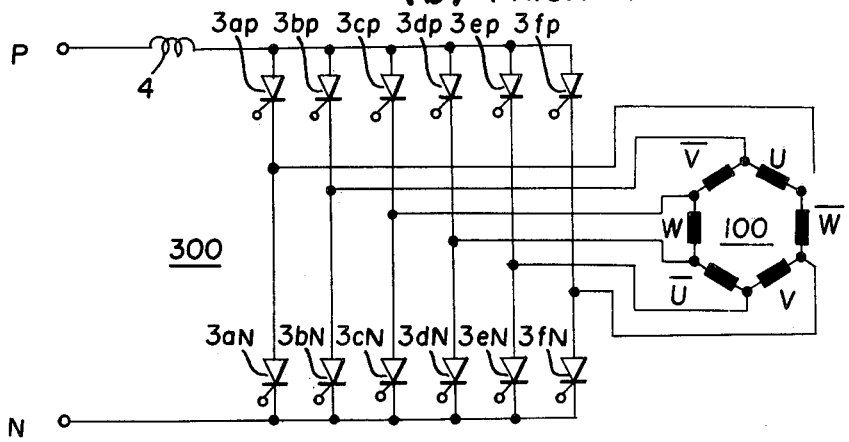
(c)
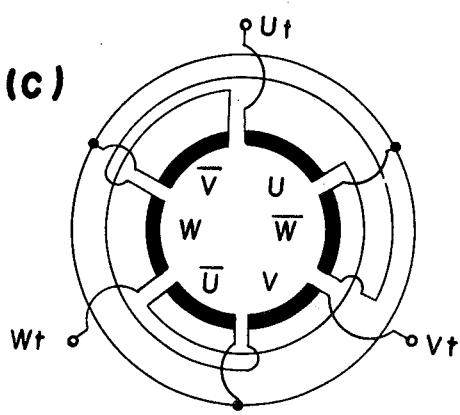
PRIOR ART
(d)
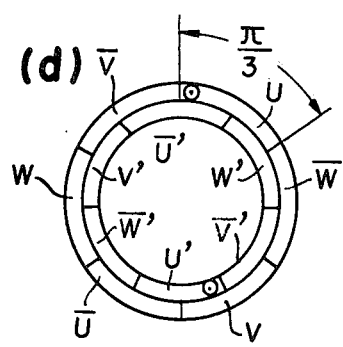
PRIOR ART FIG. 2
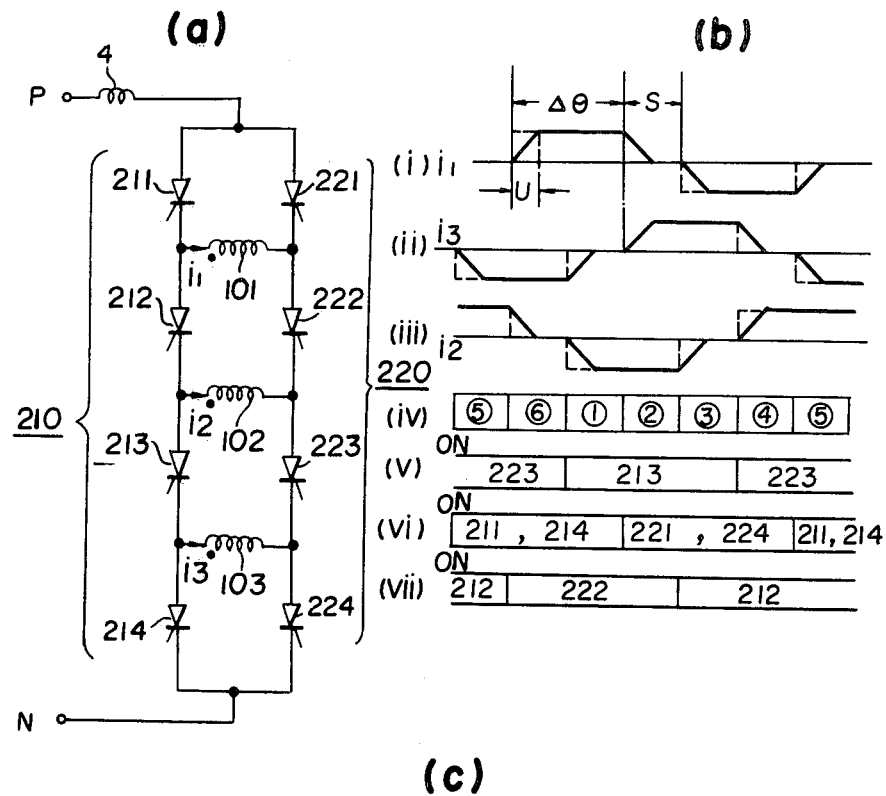
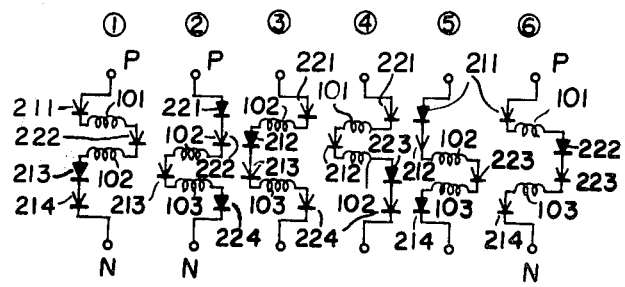

FIG. 3
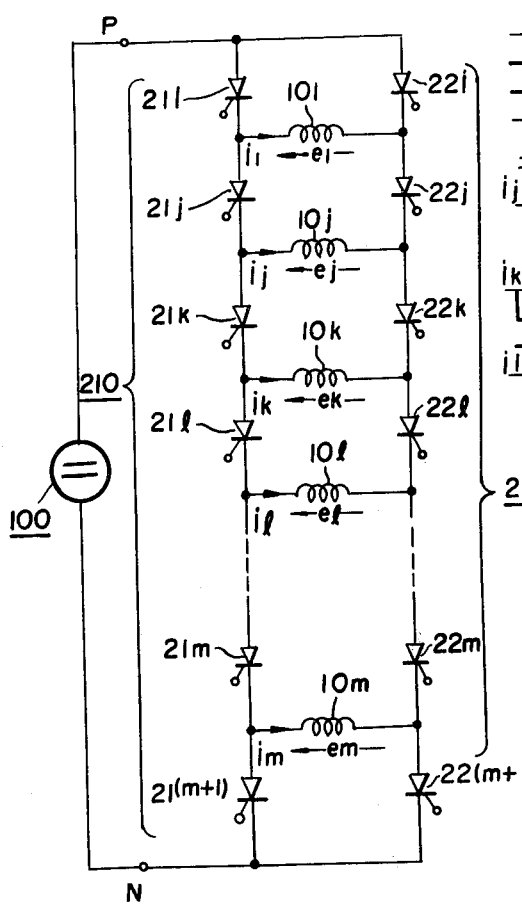
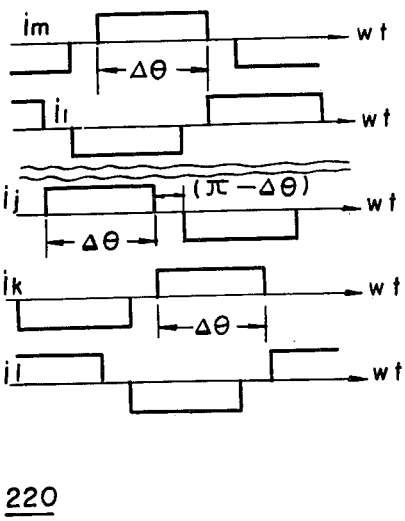
FIG. 6
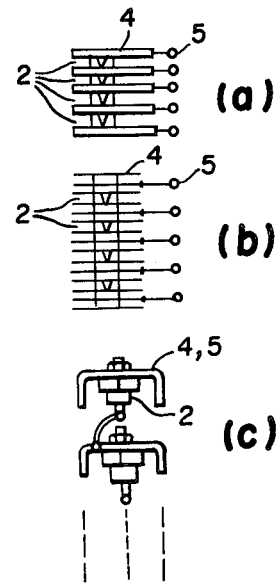

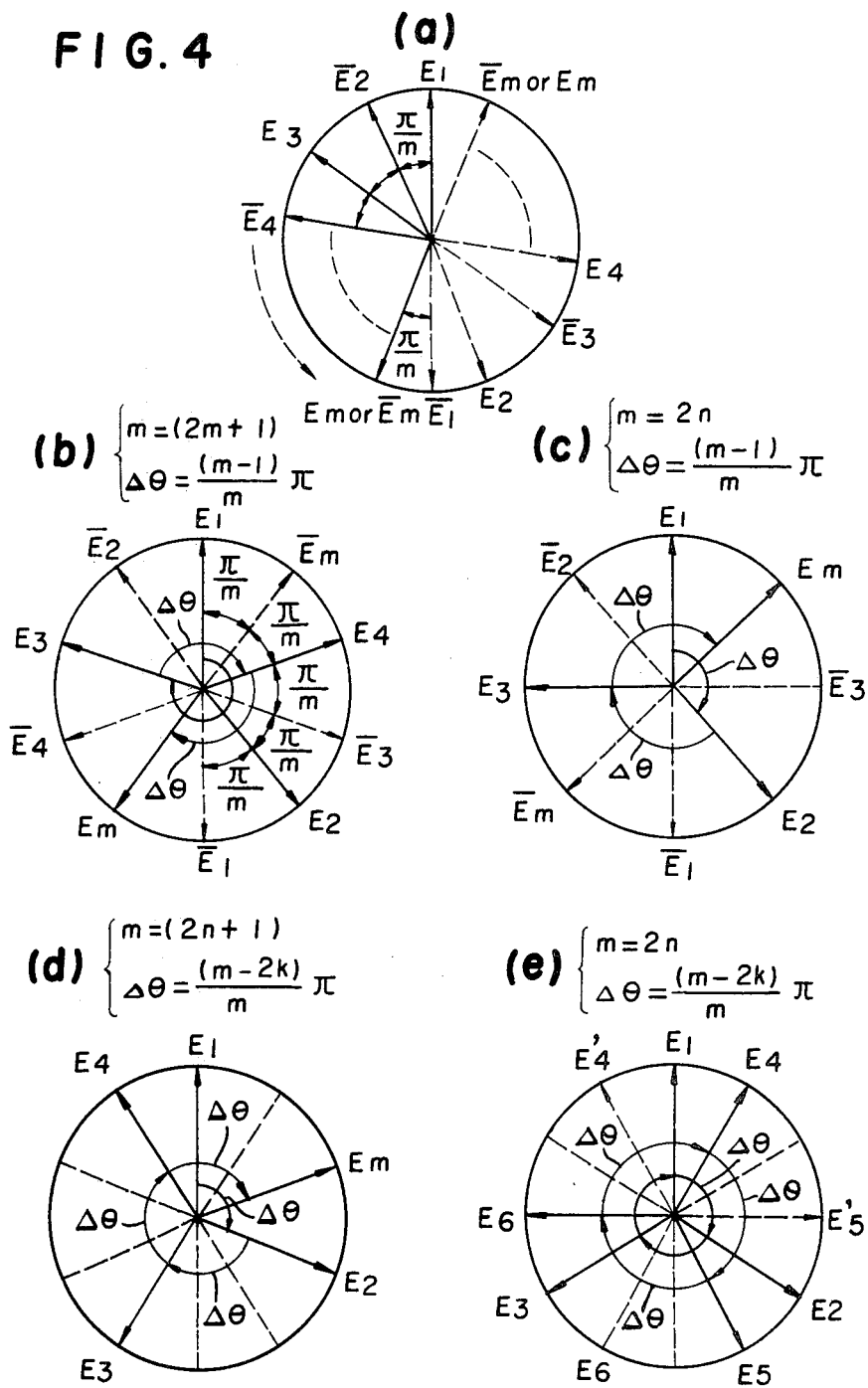

FIG. 9
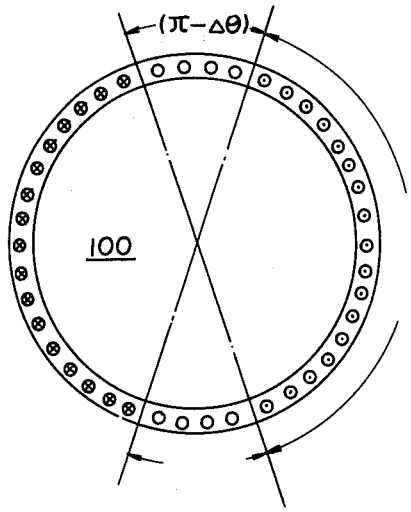
FIG. 10
(a)
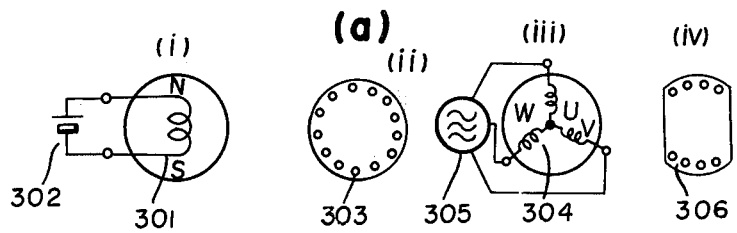
(b) 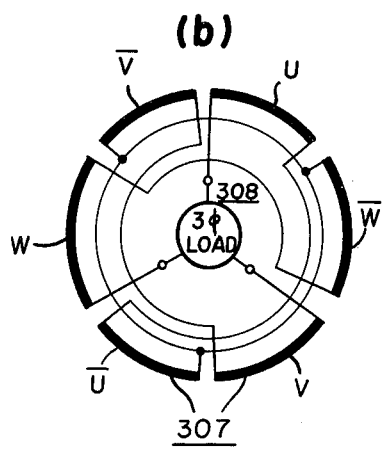  (c) 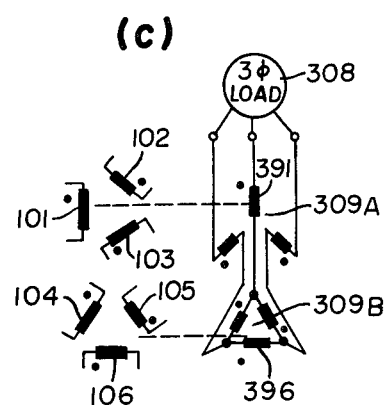

$$\Delta\theta = \pi(1 \pm \frac{k\pi}{mn})$$

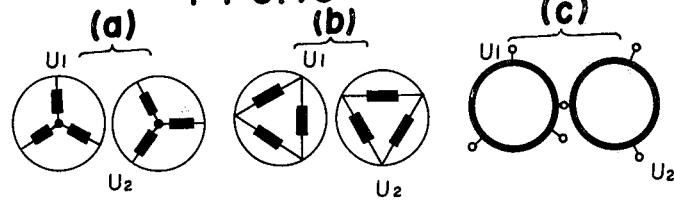
FIG.13
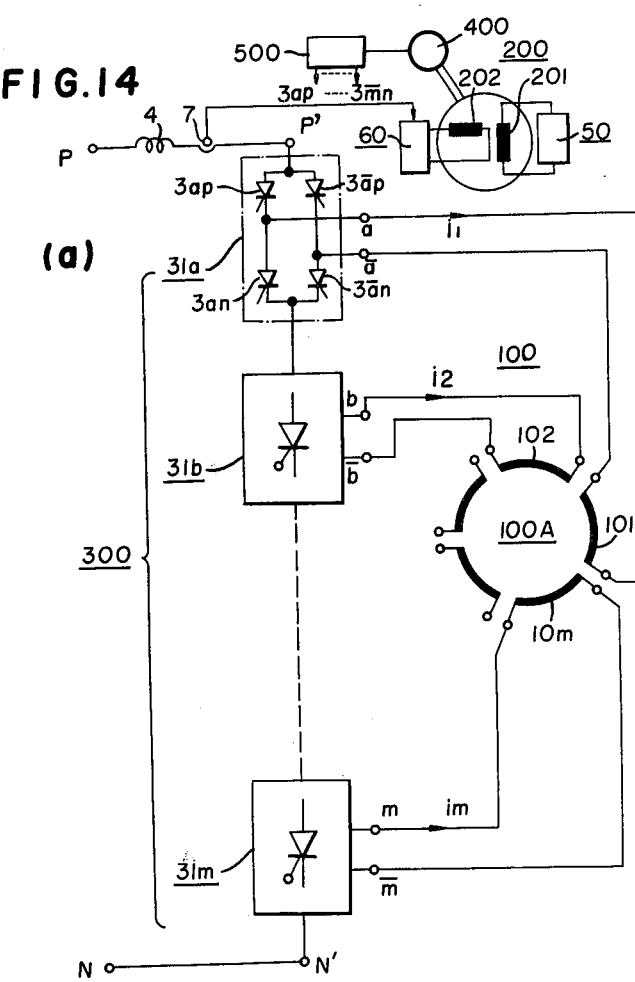
FIG.14
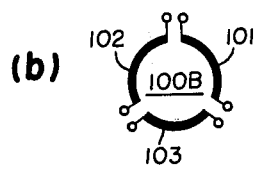
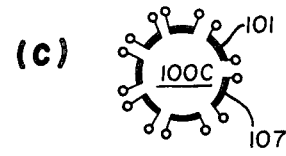

FIG. 17
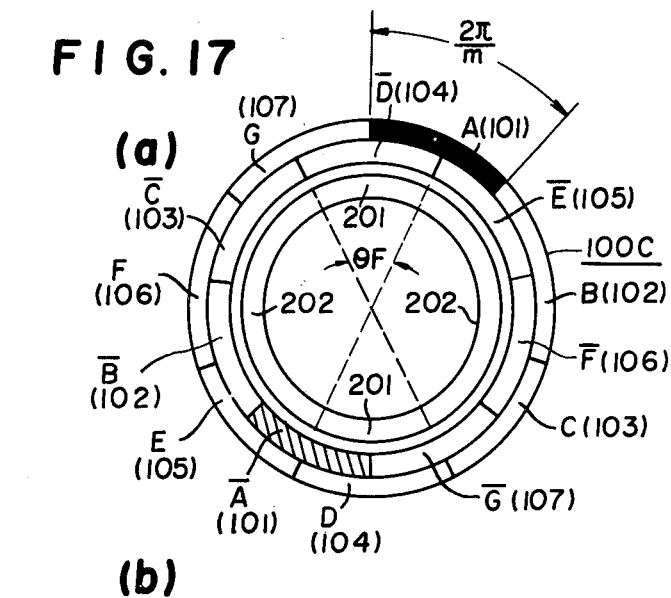
(a)
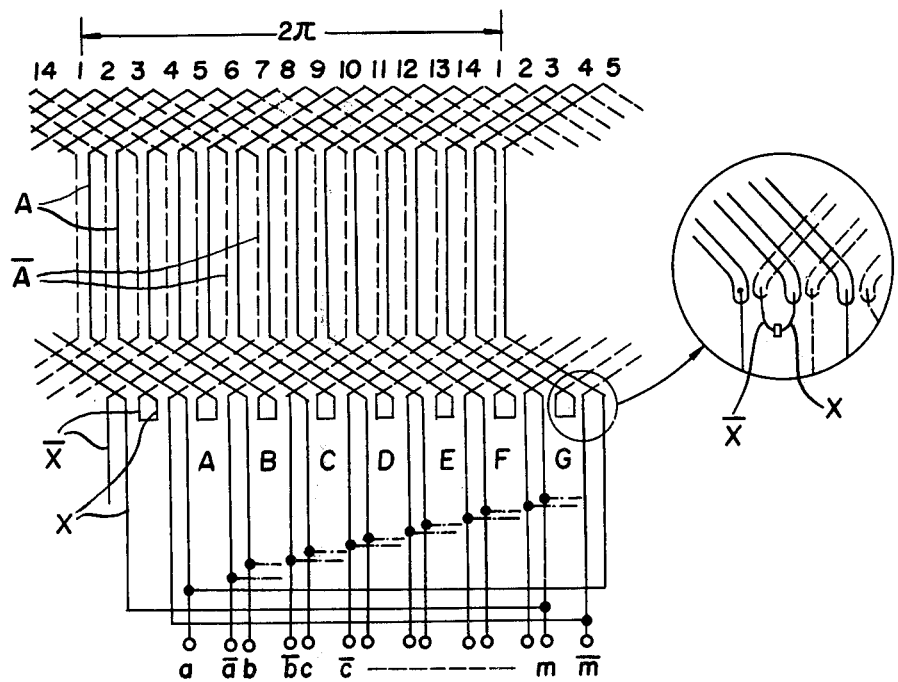
(b)

FIG. 19
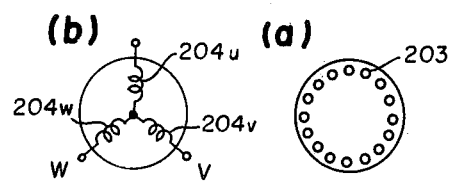
FIG. 20
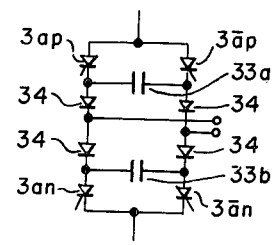
FIG. 21
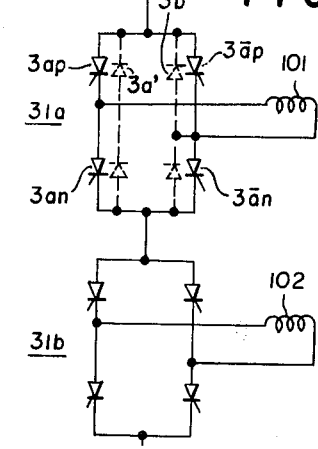
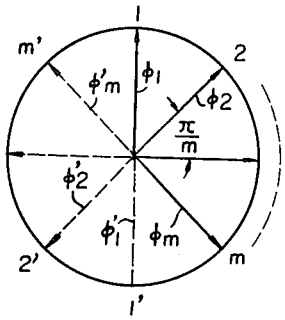
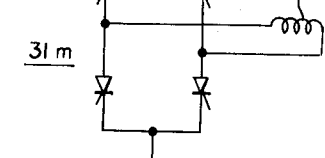
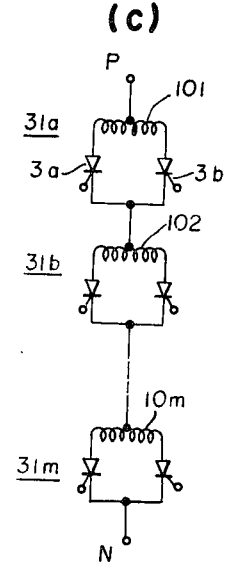

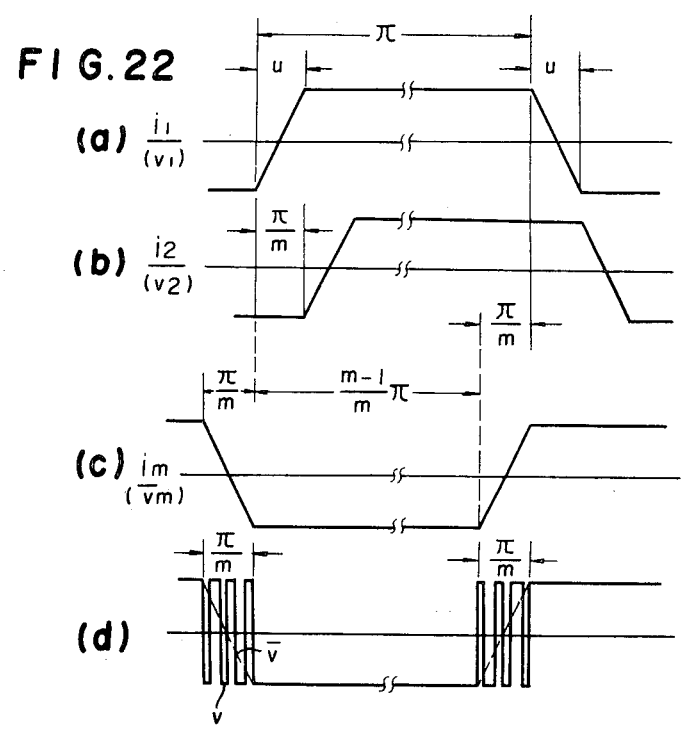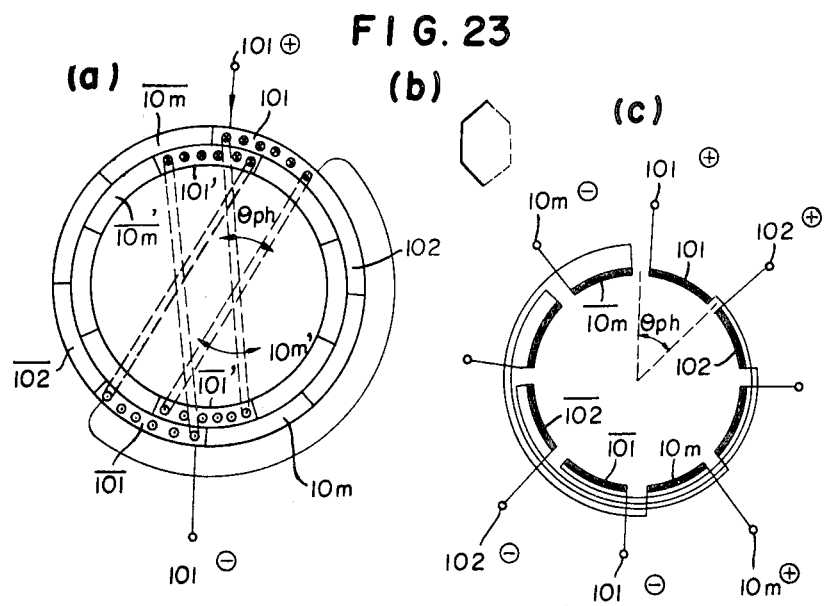

AC FEEDING APPARATUS AND ROTATING FIELD APPARATUS HAVING AC FEEDING APPARATUS

BACKGROUND OF THE INVENTION

1. Field of the Invention

The present invention relates to an apparatus for feeding multi-phase AC current from a DC power source and a rotating field apparatus having the AC feeding apparatus.

2. Description of the Prior Art

Various types of inverter feeding apparatus have been used. For example, three phase bridge inverters have been used for multi-phase AC feeding to rotary machines generating the rotating field. The three phase bridge inverters have been especially used for an internal electromotive force solid commutation motor with a synchronous motor.

For example, various motor apparatus combining a solid-state AC feeding apparatus with an AC motor such as non-commutator motors, thyristor motors and inverter feeding induction motors, have been known. These apparatuses are solid commutator motor having solid switch elements as a commutator. The combinations of a current source type converter with a synchronous motor or an induction motor impart excellent driving and regenerative braking in economical operation and they are called as "non-commutator motor" or "current type variable frequency inverter".

FIGS. 1(a), (b) show connections of a solid commutator motor having the conventional inverter wherein the references P and N are respectively designate DC input terminals; (4) designates a smoothing reactor; (300) designates a solid commutator (inverter) in a bridge connection; (100) designates AC windings for an AC motor.

FIG. 1(a) shows a three phase type embodiment and FIG. 1(b) shows a six phase type embodiment. The AC windings of the conventional AC motor are in three phases or six phases. Accordingly, the solid commutator (300) is the three phase bridge or the six phase bridge of solid switches. The apparatus having the three phase AC windings and three phase bridge shown in FIG. 1(a) has been especially used.

However, the AC windings have internal connections shown in FIG. 1(c) wherein pairs of windings (U, $\overline{U}$), (V, $\overline{V}$), (W, $\overline{W}$) in the reverse phase are respectively connected to form the phases. As the appearance, they have three phases however the structure is the six phase structure.

FIG. 1(d) shows the space distributed regions of sectional view of the conductors for the windings. In the conductor distributed region for one phase, six groups of the coil groups U, V, W, $\overline{U}$, $\overline{V}$ and $\overline{W}$ for an electrical angle of $\pi/3$ are used and the return conductor distributed region U', V', W', $\overline{U}'$, $\overline{V}'$ and $\overline{W}'$ is used. The coil pitches of the coils are usually short pitches. In the short pitches, the return conductor is not disposed to the position shifted for an electrical angle of $\pi$.

Thus, the three phase connection of FIG. 1(a) provides the six phase winding structure for a motor whereby the winding operation is the same with that of the six phase connection of FIG. 1(b).

The solid commutator (300) commutate for 6 times per one cycle in the embodiment of FIG. 1(a).

In the embodiment of FIG. 1(b), one of the positive solid switches (3ap) to (3fp) and one of the negative solid switches (3aN) to (3fN) such as (3ap) and (3dN) are simultaneously turn-on in the turn-on control. Each pair of the AC windings U and $\overline{U}$; and V and $\overline{V}$; W and $\overline{W}$ are simultaneously commutated. Thus, in the six phase connection, the solid commutator commutates for 6 times per one cycle.

The characteristics of the motor and the structure of the windings are substantially the same in the embodiments of FIGS. 1(a) and (b). The embodiment having six phases has no advantage for double of phases. The conventional solid commutator motor has small series connections of the solid switches whereby it is difficult to apply high voltage. The solid switches are mainly connected in parallel whereby it is difficult to mount them in one piece.

In the bridge type inverter, the pulsation caused by switching is large and the arrangement of connections of the solid switches is complicated disadvantageously.

The conventional apparatuses have disadvantages of the large switching pulsation and the complicated arrangement of the solid switches.

SUMMARY OF THE INVENTION

It is an object of the present invention to provide an inverter type AC feeding apparatus having easy structure of connection of solid switches and a rotating field apparatus using the AC feeding apparatus.

It is another object of the present invention to provide an AC feeding apparatus for reducing a switching pulsation.

It is the other object of the present invention to provide a solid commutator motor which can be used in high voltage and has a solid switch circuit which is easily mounted on the motor in one piece.

The foregoing and other objects of the present invention have been attained by providing an AC feeding apparatus wherein a plurality of groups of each series solid switch group having N of solid switches connected in series are connected in parallel and connected to a DC power source and coils for n phase are connected between the serial contacts of the solid switches of the series solid switch group to provide m groups of coils in the relation of $2m \geq N \geq (m+1)$, and at least two groups of the coils are excited with each phase difference of $\Delta\theta(\neq\pi)$ in the turn-on control of the solid switches.

A rotating field is formed by arranging the coil conductors in substantially cylindrical or disc space along the peripheral part thereof and exciting m groups of the coils sequentially with each phase difference of $\Delta\theta(\neq\pi)$.

The rotating field is used for a rotary machine.

BRIEF DESCRIPTION OF THE DRAWINGS

FIGS. 1(a), (b), (c) and (d) are respectively circuit diagrams of the conventional apparatus and waveforms for illustrating the operations.

FIGS. 2(a), (b) (c) and (d) are respectively circuit diagrams of one embodiment of the apparatus of the present invention and waveforms for illustrating the operations.

FIGS. 3(a) and (b) are respectively circuit diagrams of one embodiment of the m phase apparatus of the present invention.

FIGS. 4(a), (b), (c), (d) and (e) are respectively diagrams for illustrating relation of phases of the m phase apparatus;

FIGS. 6(a), (b) and (c) are respectively schematic diagrams of connections of solid switches;

FIG. 9 is a sectional view of the rotating field apparatus of the present invention;

FIGS. 10(a), (b) and (c), and FIG. 11 are respectively diagrams of the other embodiments of the present invention;

FIG. 12 and FIGS. 13(a), (b) and (c) are respectively the circuit diagrams of the other embodiments of the present invention;

FIG. 14(a) is a connection diagram of a solid commutator motor of the present invention;

FIGS. 14(b) and (c) are respectively the other embodiments of the armature windings;

FIGS. 17(a) and (b) are respectively schematic views for illustrating AC windings;

FIGS. 19(a) and (b) are respectively schematic views of the other embodiment of field windings;

FIG. 20 is a connection diagram of the other embodiment of a bridge connection;

FIGS. 21(a) and (c) are respectively circuit diagrams of the other embodiments of the present invention;

FIG. 21(b) is a view showing the phase relationship;

FIG. 22 is a diagram of waveforms

FIGS. 23 and 24 are respectively views of the embodiments of AC windings of an AC motor used in the present invention;

FIG. 25(a) shows a current distribution of AC windings in the apparatus of the present invention;

DETAILED DESCRIPTION OF THE PREFERRED EMBODIMENTS

Figure 5:
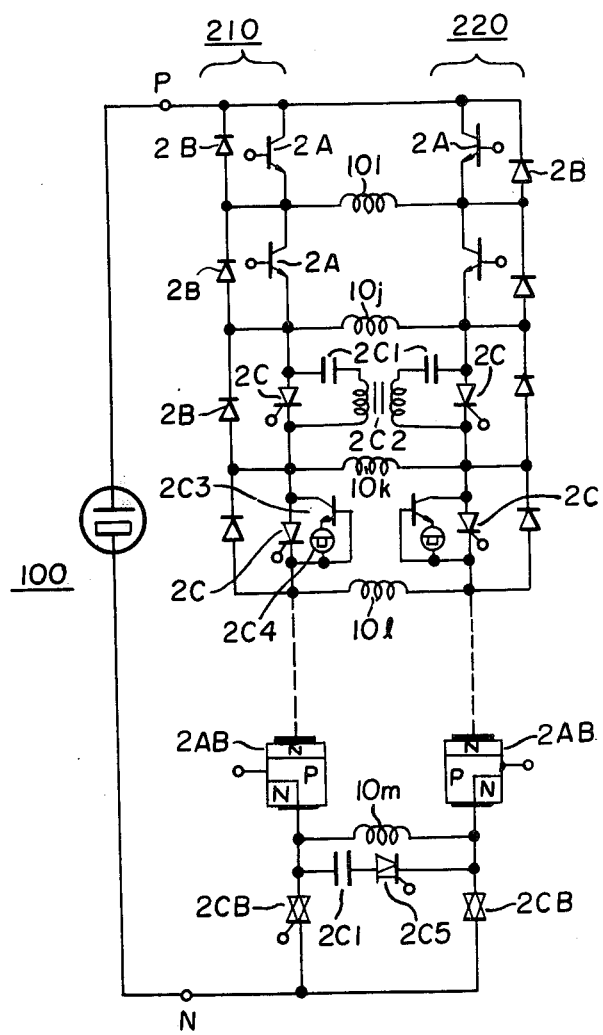
FIG. 5 is a circuit diagram of the other embodiment of the present invention.

FIG. 2(a) is a circuit diagram of one embodiment of the AC feeding device of the present invention and FIG. 2(b) is a time chart showing waveforms of currents passed through the AC windings and ON-OFF states of solid switches; and FIG. 2(c) designates a circuit diagram in each section.

In FIG. 2(a), the reference numerals (211), (212), (213) and (214) respectively designate solid switches such as thyristors which are connected in series to form the first arm group (210). The references (221), (222), (223) and (224) respectively designate solid switches such as thyristors which are connected in series to form the second arm group (220). The references (101), (102) and (103) respectively designate phase coils of the three phase AC windings of a rotating machine which are respectively connected between the contacts of the solid switches of the first arm group (210) and the contacts of the solid switches of the second arm group (220). In the embodiment, the phase windings (101), (102) and (103) are respectively one phase (n=1) coils. The group of coils (hereinafter referring the coil group number as m) connected in a ladder type are three (m=3). The reference (4) designates a smoothing reactor and P and N designate terminals of the DC power source.

The AC feeding device of FIG. 2(a) is to commutate the thyristors (211) to (214) and (221) to (224) by the counter electromotive force generated in the coils (101), (102), (103).

FIG. 2(b) (i), (ii), (iii) show waveforms of the currents $i_1$, $i_2$ and $i_3$ passed through the coils (101), (102), (103). FIG. 2(b) (iv) shows the sections of the operating times and FIGS. 2(b) (v), (vi) and (vii) respectively time charts wherein the solid switches in ON state among the solid switches (211) to (214) and (221) to (224) in the sections ① to ⑥ wherein the symbol →+ designates a solid switch which is turned on at the time section and the symbol →− designates a solid switch which keeps ON state from the previous time section.

In FIG. 2(c), the overlapping angle is neglected.

The operation will be illustrated.

In FIGS. 2(a) to (c), in the time section ①, the solid switch (213) is turned on and the solid switches (211), (214), (222) keep ON state from the previous time section ⑥ whereby the DC current path is formed as shown in FIG. 2(c) ① and the current $i_1$ and $i_2$ are respectively fed to the coils (101), (102) as shown in FIG. 2(b). The coil (103) is not turned on. In the time section ②, the solid switches (213), (221), (224), (222) are turned on respectively to feed the currents $i_2$ and $i_3$ to the coils (102), (103). Thus, in the time sections ③ to ⑥, the current circuits are formed as shown in FIG. 2(c) ③ to ⑥ to respectively feed the currents to the coils sequentially.

The operations of the solid switches are further illustrated.

The solid switches are respectively in ON state during the time of the electrical angle π (precisely the overlapping time is added), in principle.

The solid switches in the same series step among the first arm group (210) and the second arm group (220) such as the couples of (221):(222) and (212):(222) and (214):(224) respectively turn on in the reverse phase relationship. The fact is clear from FIG. 2(b) (v), (vi), (vii).

The solid switches (211), (214), (221) and (224) adjacent to the positive terminal P, and the negative terminal N are turned on at the phase angle corresponding to the fundamental wave of vector sum of currents passed through the windings (101), (103) connected to the solid switches. The solid switches (e.g. (212), (222)) connected to two coils (e.g. (101) and (102)) in the adjacent steps, are turned on at the phase angle corresponding to the phase of the fundamental wave of vector sum of currents passed through the coils (101), (102) connected to the solid switches.

For example, in FIG. 2(b) of the waveform shown by the broken line, the overlapping angle μ is neglected. In the vector sum ($i_1+i_2$) of $i_1$ and $i_2$ shown in the waveform shown by the broken line, the positive pulse is given in the time section ① and the negative pulse is given in the time section ④. In the time section ①, the solid switch (222) is turned on and in the time section ④, the solid switch (212) is turned on. In the time sections ⑥ and ② having the central phase being the same with that of the time section ①, the solid switch (222) is turned on. In the time sections ③ and ⑤ having the central phase being the same with that of the time section ④, the solid switch (212) is turned on.

That is, the time sections ③, ④, ⑤ are the specific ON state sections for the solid switch (212) and the time sections ⑥, ①, ② are the specific ON state sections for the solid switch (222).

In some section, two adjacent solid switches connected in one arm group are simultaneously turned on. For example, in time section ②, the solid switches (221), (222) are simultaneously turned on. In the simultaneous turn-on section that is, the free pass section S, the current is not fed to the coil (101) to stop $i_1$ (the overlapping angle $\mu$ is neglected.) The fundamental feeding section $\Delta\theta$ of the current $i_1$ is ($\pi$ − S), and it is equal to the phase difference between adjacent coils. When the phase difference between the adjacent coils is 180 degree, it is a single phase to feed two zig-zag routes for each 180 degree and to feed the rectangular waveform whose polarity is inverted for each 180 degree, to the coil.

In the embodiment of FIG. 2 of the present invention, the phase differences between the coils, (101), (102), (103) are respectively 120 degree and the rotating field is formed by the current passed through the coils.

In the embodiments, the coils (101), (102), (103) are respectively one coil (n=1) and the coil groups are m=3 whereby the total phases are nm−1.3=3. (three phases).

Referring to FIG. 3, the common embodiment of the coil group number of m will be illustrated.

In the embodiment, as the same with the embodiment of FIG. 2 the coil in each group is one coil (n=1) and the total phases are n.m=1×m=m, (m phases).

The first arm group (210) has solid switches (e.g. thyristors) of (211), (21j) ... {21 (m+1)} and the second arm group (220) has solid switches of (221) (22j) ... {22 (m+1)}. The coils (101) (10j) ... (10m) are respectively connected to the contacts between the solid switches of the first arm group (210) and the second arm group (220). The numbers of the coil groups are m and the numbers of the solid switches are (m+1) in each arm group (210) to (220) and the reference (100) designates a DC power source.

FIG. 3(b) shows fundamental waves of the current $j_m$ of the m phase coil; the current $i_j$ of the j phase coil (10j), the current $j_k$ of the k phase coil (10k) and the current $j_l$ of the l phase coil (10l).

The relationship of the coils in the embodiment will be illustrated in detail.

In FIG. 4(a), the voltage vectors $E_1$ to $E_m$ (phase vectors) of the coil (101) ... (10m) are arranged with the phase difference of $\pi/m$ in the electrical angle $\pi$. As the negative phase symbol, the bar "−" is added on the even vectors $E_2$, $E_4$ ... because the terminal connected to one arm group (210) is defined as a positive direction and the polarity is considered.

The vectors $E_1$, $\overline{E}_2$, $E_3$, $\overline{E}_4$ ... $E_m$ or $\overline{E}_m$ and the reverse phase vectors $\overline{E}_1$, $E_2$, $\overline{E}_3$ ... $\overline{E}_m$ or $E_m$ shown by the dotted line can be considered. In the vector at even number, the vectors $E_2$, $E_4$ ... in the reverse phase shown by the dotted line are considered as the standard polarity.

In the case of odd number phases of m ($m=2n+1$), the vectors shown by the full line in FIG. 4(b) are given by rewriting the vectors of FIG. 4(a) to the standard vector arrangement having each phase difference $\Delta\theta$. The vectors shown by the dotted line are the reverse phase vectors to the vectors shown by the full line.

In FIG. 4(b), the following relation is given.

$$\Delta\theta = (\pi - \pi/m) = (m-1)/m\ \pi.$$

wherein $\Delta\theta$ is the fundamental feed pulse width in each phase (see FIG. 3(b)). In FIG. 4(b), the case of m=5 is shown.

In the case of even number phase ($m=2n$), the vectors of FIG. 4(a) are given by rewriting the vectors of FIG. 4(a). In this case, the phase difference $\Delta\theta$ is given as $\Delta\theta = (m-1)\pi/m$.

In FIG. 4(a), the phase difference is $\Delta\theta = (m-1)\pi/m$ and the quiescent time S (see FIG. 2(b)) is $S = \pi - \Delta\theta = \pi/m$. The numbers and the symbols "−" and the phase revolution are defined so as to give said standard.

The other m phase vector phase arrangement will be illustrated.

FIG. 4(d) shows the m phase vector phase arrangement wherein $\Delta\theta = (m-2k)\pi/m$, $m=2n+1=$odd phase number and k is natural number. In FIG. 4(d), m=5, k=1 ($\Delta\theta = 3/5$) are considered.

FIG. 4(e) shows the m phase vector phase arrangement wherein $\Delta\theta = (m-2k)\pi/m$, $m=2n=$even number of phases.

In FIG. 4(e), m=6, k=1 ($\Delta\theta = 2/3\pi$) are considered.

When m is even number and (m−2k) is even number, the phases are arranged with the phase difference $\Delta\theta$, one group ($E_1$, $E_2$ and $E_3$ in FIG. 4(e)) among the m vectors is cycled and then the other group ($E_4$, $E_5$ and $E_6$ in FIG. 4(e)) is cycled to return to the first phase. In this case, it shifts to the vector having the phase difference of $\pi/m$ from the first phase, and then, it shifts for each $\Delta\theta$ from the vector to repeat it. The total phases are classified to plural groups (in each group, the phase difference is $\Delta\theta$). In this case, when all of m phases are given in the circuit of FIG. 3(a), the phase difference between the middle phases, is not $\Delta\theta$ whereby the phases are not symmetric.

In this case, the new phases $m' = m/G$ (group number: G) is applied to the embodiment of FIG. 3(a), and the circuit having the phases m' and the groups G is provided.

FIG. 4(e), shows three phases and two groups (m'=3; G=20, whereby two groups of the circuits of FIG. 2 are given. The m' phases G groups circuits can be connected in series or in parallel to the DC power source.

The fact that the invention can be applied for desired phases, has been illustrated.

Various m phase vector phase relations for desired phases m wherein the phase difference between the adjacent phases is $\Delta\theta$ and the feed pulse width is $\pi/m$ or natural number times of $\pi/m$ can be given.

The desired phases and the desired feed angle can be selected depending upon the consideration.

FIG. 5 is a circuit diagram of the other embodiment of the present invention which is a voltage type inverter using solid switches having reverse conductivity.

In FIG. 5, the connection that the solid switches having reverse conductivity which are connected in series in the first arm group (210) and the second arm group (220) are formed with the transistor (2A) and the diode (2B) and the connection that they are formed with the thyristor (2C) and the diode (2B), the connection that they are formed with the reverse conductive transistor (2AB) and the connection that they are formed with the reverse conductive thyristor (2CB) are shown. The solid switches in each arm can be formed only one type connection though the combined connections can be used.

In FIG. 5, as the connection for turning off the thyristor (2C) and the reverse conductive thyristor (2CB), the connection using the capacitor (2C1) and the commutation pulse transform (2C2), the connection using the commutation transistor (2C3) and the commutation pulse source (2C4), and the connection using the commutation capacitor (2C1) and the commutation thyristor (2C5) are shown. The connection for turning off them can be one of these connections.

The connection of FIG. 2(c) can be given under the consideration of FIG. 5 wherein it has three phase and the connections for turning on the solid switches in sequence of (v), (vi), (vii) of FIG. 2(b) to shortcircuit by the diode (2B) and the solid switches (2A), (2C) are excluded. As the result, the voltage is always applied to two coils to give voltage waveforms as shown by the broken lines of (i), (ii), (iii) of FIG. 2(b) which are rectangular waveforms having 120 degree width.

As described above, the present invention can be applied as the voltage type inverter.

In accordance with the AC feeding devices shown in FIGS. 2, 3 and 5, only two groups of the arm groups having solid switches connected in series can be used to simplify the structure of connections.

The arm group can be easily prepared by forming plane type solid switch elements or a layer structure of semiconductor wafers.

FIGS. 6(a), (b), (c) are schematic views of certain embodiments of the arm group wherein the reference (2) designates semiconductor elements, (4) designates lead electrodes which can be used as heat radiation fins.

Certain embodiments of arrangements of coils connected to the AC feeding device for the rotating field machines especially, the m phases AC rotary machine will be illustrated.

FIG. 7(a) is a space distribution view shown as a sectional view of the AC winding conductors, wherein the conductors are distributed in the slots formed on the inner peripheral part or the outer peripheral part of the core or on the surface of the core. Sometimes, a core is not provided. In FIG. 7(a), the directions of the current passed through the coil conductors for one phase are shown as the marks $\otimes$ and $\odot$. The full line part is disposed to the outer peripheral part and the dotted line part is disposed to the inner peripheral part in the stator or the rotor.

The embodiment has two layer windings wherein the return-part of the conductor (101) is shown as ($\overline{101'}$) and the return-part of the conductor ($\overline{101}$) is shown as (101').

In FIG. 7(a), the return-parts are departed with an electrical angle being smaller than the electrical angle of $\pi$, and it shows the two layer windings for a short pitch coil.

The coil group (101), ($\overline{101'}$) and the coil group ($\overline{101}$) (101') which have the reverse phase each other are mutually connected in reversely series to form the windings for one phase and one pair of poles. The windings for one phase are always connected in series for pairs of poles. The other phases are the same conditions. The arrangement of the windings are shown only as the forward conductors for the first layer, (101) to (10m) and ($\overline{101}$) to ($\overline{10m}$) and the distribution of the return conductors (101') to (10m') and ($\overline{101'}$) to ($\overline{10m'}$) are not shown in FIG. 7(c).

In FIG. 7(c), the distributed region of the first layer conductors of the coil is shown by black belts. The width of the distribution of the conductors for one phase, that is the phase belt $\theta$ph is $\pi$/m and the conductors in the reverse phase region are connected in series as the connection of the windings for each phase. When the references (101$\oplus$) to (10m$\oplus$) are defined as the positive terminals of the windings for each phase, the relations of the phases are shown in FIGS. 4(a), (c).

Figure 7:
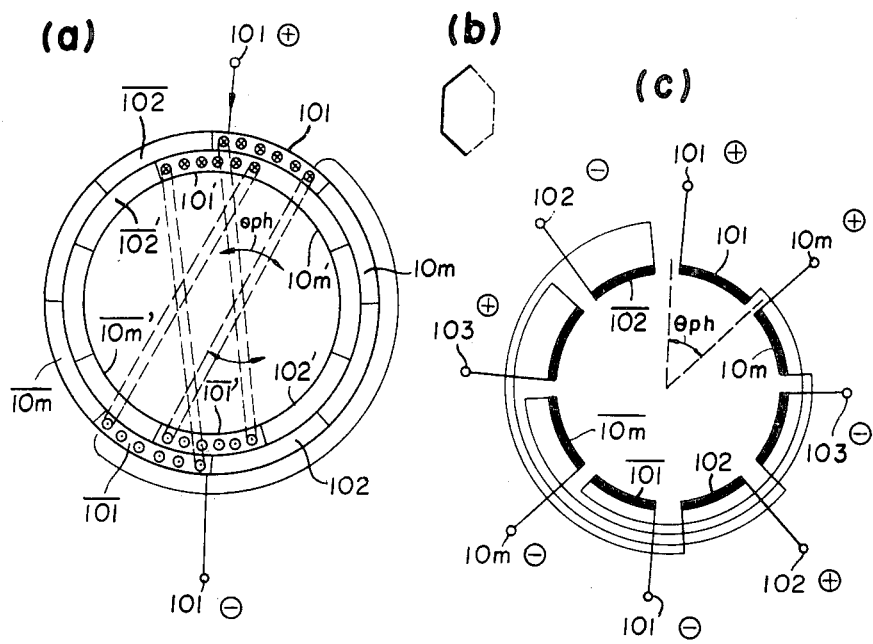
FIGS. 7(a), (b) and (c) and FIGS. 8(a) and (b) are respectively diagrams of embodiments of the m phase windings of the rotating field apparatus of the present invention.

In FIG. 7, even number phases such as 4 phases, 6 phases and 8 phases, especially 4 phases are considered as the winding diagram.

Figure 8:
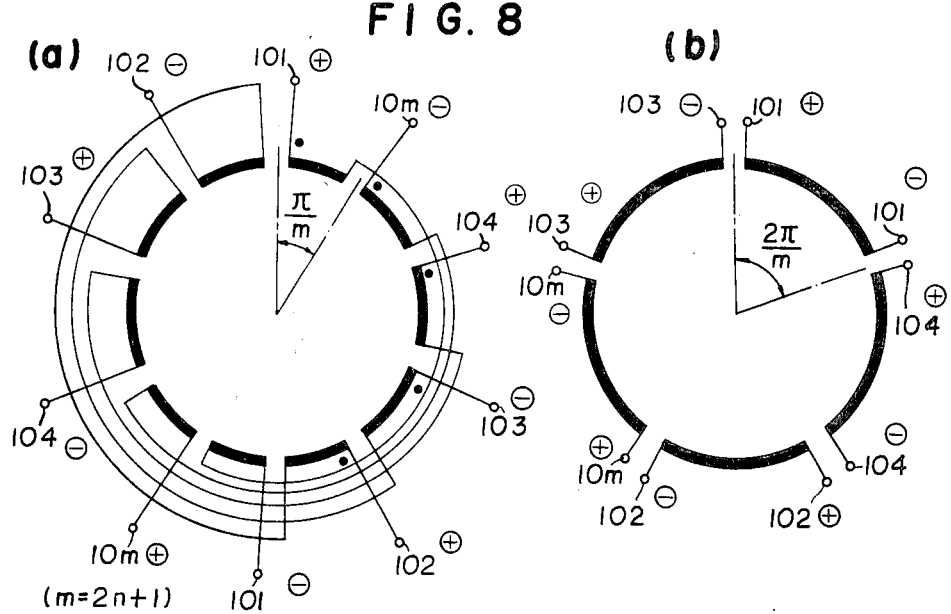

In FIG. 8, odd number phases such as 5 phases and 7 phases, especially 5 phases are considered as the winding diagram.

In FIG. 8(a), the phase belt $\theta$ph is $\pi$/m as the embodiment of FIG. 7, and the windings for one phase per one pair of poles are the pair of coils in the reverse phase. In FIG. 8(b), the phase belt $\theta$ph is $2\pi$/m.

The winding method of the phase belt $\theta$ph of $\pi$/m is suitable for the case of the even number of phases or the small numbers of phases, whereas the winding method of the phase belt of $2\pi$/m is suitable for the case of the large numbers of phases and the odd number of phase. The vector phase arrangements of FIG. 8 correspond to those of FIGS. 4(a), (b).

The multi-phase distributed windings are conductors arranged to wind in a cylindrical space or a disc space. When the windings are combined with the m phase inverter circuit shown in FIG. 3, the current distribution of the coil conductors is smoothly rotated to impart high space utility.

FIG. 9 shows the current distribution in the AC winding conductor group having the phase belt $\theta$ph of $\pi$/m in the embodiment of the present invention. The conductors for one phase are in quiescent time ($S=\pi-\Delta\theta=\pi/m$) and the other conductors are in the stationary peak value. The symbol $\bigcirc$ designates the quiescent coil. When the solid switch is switched, the current is fed in the next polarity to the quiescent conductor belts of the coil and the adjacent conductor belt is in quiescent state. Thus, the smooth rotary current distribution is formed whereby the smooth rotated electromotive force is resulted and the smooth low torque pulsation can be obtained.

In the voltage type inverter, the symbols $\otimes$, $\odot$ in FIG. 9 show the voltage (electromotive force) distribution.

When $\Delta\theta=(m-1)\pi/m$, (the arrangement of FIGS. 4(b), (c), only the conductor belt for one phase is in quiescent state, whereby the number of the conductors in quiescent state are small and the numbers of conductors for effective output per unit space is large and the space utility is improved.

The connections of the solid switches are simple and accordingly, the number of the phases can be easily increased and the torque pulsation (switching pulsation) can be descreased and the space utility can be increased. Moreover, the windings for forming the multi-phase rotating field (motor etc.) can be easily combined.

The multi-phase AC distributed windings and the structure of the electromagnetic device for forming the rotating field shown in FIGS. 7 to 9 can be applied for the following cases.

When the m phase AC windings (100) fed from said inverter circuit are disposed on the stator of a rotary machine, the rotor faced to the stator can be applied for various apparatus shown in FIGS. (a) (i) to to (iv).

FIG. 10(a) (i) shows a synchronous motor having a magnetic rotor or an electromagnetic rotor which is effective as a non-commutator motor. In FIG. 10(a) (i), the reference numeral (301) designates a DC exciting windings and (302) designates an exciting power source.

FIG. 10(a) (ii) shows a cage type induction motor.

FIG. 10(a) (iii) shows a wound-rotor type induction motor connecting the multi-phase primary windings (three phase windings) to the multi-phase AC power source. The m phases AC windings (100) fed from the inverter are the secondary windings to form the Scherbius system and the Kraemer system.

FIG. 10(a) (iv) shows a reluctance motor having convex pole rotor (306).

FIG. 10(b) shows a rotating field generator having said m phase AC windings, for example, the m phase AC windings (100) are disposed in the slots and the other phase (e.g. three phases) AC secondary windings (307) are disposed in the same slots to connect the AC load (308) to the windings. That is, the rotating field generator, is utilized as a phase number converting transformer. In the embodiment, the secondary windings (307) are disposed on the rotor which is not rotated and the primary m phase AC windings (100) are disposed on the stator. It is possible to dispose the secondary windings (307) on the stator and to dispose the primary windings (100) on the rotor. It is also possible to wind one of the windings in the slots and to wind the other without a slot, whereby the field higher harmonics are decreased in the distribution of the windings and the higher harmonic electromotive force is decreased by the distributed secondary windings and the multiple effect of the multi-inverter is applied to obtain an AC output having remarkably small higher harmonics.

FIG. 10(c) shows the multi-composite output inverter transforming method using the transformer which has the advantage of easy winding process though which cause larger the higher harmonics in comparison with the embodiment of FIG. 10(b).

In the embodiment of m=6, the primary windings (101) to (106) are in the open delta connection (phase separation) and the secondary windings (309 A) are in the open star connection) and the windings (309 B) are in the Δ connection and the secondary windings (309 A) are connected in series to the windings (309 B) to feed to the load (308).

Figure 11:
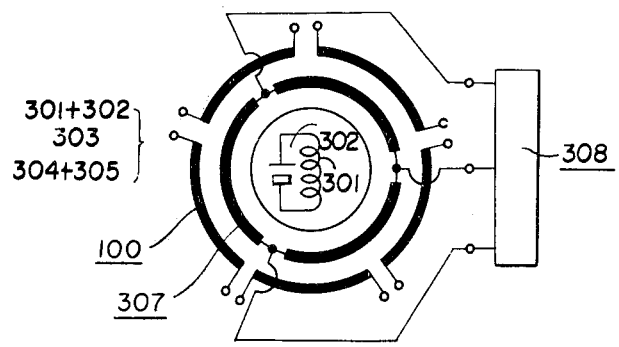

FIG. 11 shows the other embodiment having the rotary machine structure combining the features of FIGS. 10(a) and (b) which has various actions such as the transformation phase number conversion and higher harmonic-decreasing filter actions and the inverter commutation action. (the combination of FIG. 10(a) (i))

Figure 12:
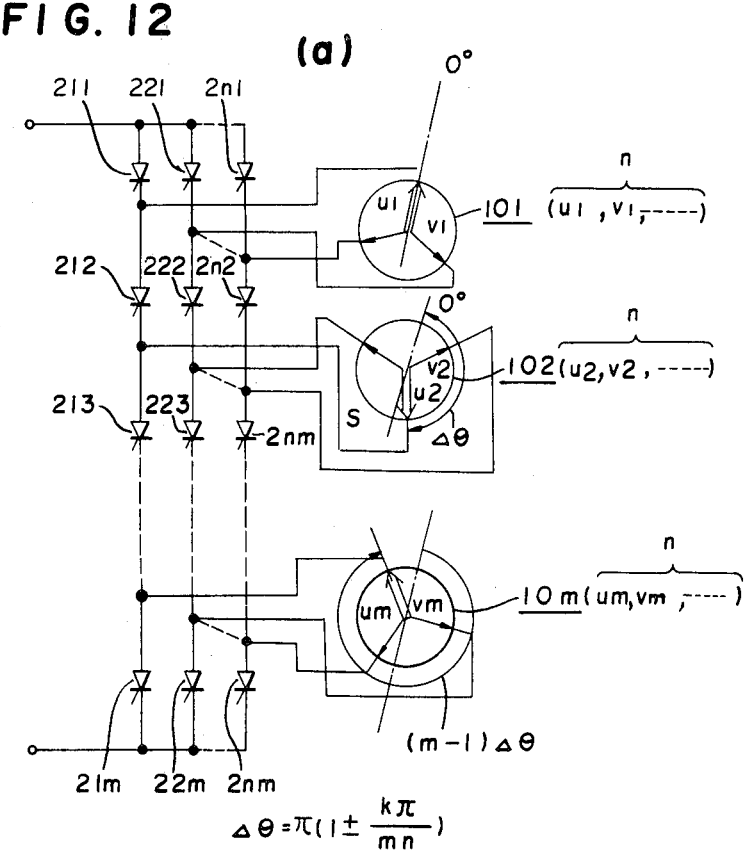

The primary m phase AC windings (100) and the secondary windings (307) fed from the inverter unit of FIG. 12 are disposed on the stator. The rotators (301), (302) are used in the case of the synchronous machine and the rotator (303) is used in the case of the cage type rotator and the rotators (304), (305) are used in the case of the wound type induction machine.

In the case of the rotors (301), (302) of the synchronous machine the excitation can be resulted by feeding from the field (301) whereby the solid switches of the inverter can be commutated by the inner electromotive force and they can be simplified.

FIG. 12 shows the circuit connection of the other embodiment. In the former embodiments, the phase number n for one step is 1, that is, the single phase, and the m steps of single phases are given. In the embodiment of FIG. 12, the n phases are given in one step. In the solid switch circuit, the n groups of the series arm group (connecting (m+1) steps in series) are connected in parallel. The phases in one step have each phase difference of $2\pi/n$ and the total phase numbers are n. m. The phase difference $\Delta\theta$ between the steps is given by the equation $$\Delta\theta = \pi(1 + k/m\cdot n) \text{ or } \Delta\theta = \pi(1 - kn/m\cdot n).$$

wherein k is odd when n is even and k is natural number (odd or even number) when n is odd number and k can be usually 1.

When n=3 and m=2, the vector is shown by the full line of FIG. 4(e), and they respectively correspond as follows $E_1 \rightarrow U_1; E_2 \rightarrow V_1; E_3 \rightarrow W_1; E_4 \rightarrow U_2; E_5 \rightarrow V_2; E_6 \rightarrow W_6.$ The winding connections are shown in FIGS. 13(a), (b), (c) such as Y connection assemble, Δ connection assemble; ring connection assemble and combination thereof.

As illustrated, the present invention can be applied for the case of the n phases for each step and the m steps.

In accordance with the embodiment of the present invention, the connections of the solid switches can be simplified in the AC feeding device with solid switches from the DC power source and the electric or electromagnetic pulsation caused by the switching of the solid switches can be decreased by forming the phase difference $\Delta\theta(\Delta\theta \neq \pi)$ which is not a negative phase between the steps.

In the previous embodiments of the AC feeding devices of the present invention, the AC windings having the n phases (In FIGS. 2, 3 and 5; n=1; in FIG. 12; n=3) and the m steps, are wound and the number N of the series solid switches in one arm group are less than 2m, that is, $2m > N > (m+1)$.

The other embodiment of the present invention having the equation of $2m = N \geq (2m + 1)$ will be illustrated.

FIG. 14(a) is a circuit diagram of one embodiment of a solid commutator motor of the present invention wherein the reference (100) designates armature windings of a motor having the first phase AC windings (101) to the mth phase. AC windings (10m) wherein the windings in the phases are spaced; (200) designates a field windings of a motor having a direct-axis field windings (201) and a quadrature field windings (compensation windings) (202). When the armature windings (100) are wound on a stator of a motor and the field windings (200) are wound on a rotor, the slipping decreases and it is advantageous to form the brush-less type. The reference numeral (50) designates a direct-axis exciting power source for feeding current to the direct-axis field windings (201); and (60) designates a quadrature-axis exciting means for feeding DC current being proportional to the current passed into the DC input circuit, into the quadrature-axis field windings (202) in the reverse polarity; (7) designates a current detector for feeding the current being proportional to said current. This can be also directly connected in series to the DC input circuit.

The AC windings (101) to (10m) in the phases have separately the terminals a, $\bar{a}$ to m, $\bar{m}$ which separate the phases. The phase number m is preferably 3, 5 or 7. In the embodiment, the five phases of the armature windings (100A) are shown. In FIG. 14(b), the three phases of the armature windings are shown and in FIG. 14(c), the seven phases of the armature windings are shown.

The solid commutator circuit (300) comprises the m phases of each group of the bridge connection (31a) to (31m) having the four solid switches (3ap), (3pn), (3āp), (3ān). The AC windings (101) to (10m) in the phase are connected to the AC terminals a, ā to m, m̄ of the bridge connections (31a) to (31m). The DC terminals of the windings are connected in series connection to the DC input terminals P' and N'. The filter reactor (4) and the current detector (7) are connected in series between the DC input terminal P' and the DC input terminal P. In one group of the bridge connection, the solid switches (3ap):(3ān) or (3an):(3āp) are respectively turn on at the same time or with the specific phase difference to be controlled.

In the other phase groups, the solid switches are also turned on with the phase difference of $2\pi/m$ to be controlled. The turn-on can be carried out by the rotary position detecting allotter (400) operated depending upon the rotation of the field (200) and the turn-on controlling means (500) controlled by the device.

In the case of the simultaneous turn-on control method, the commutation is caused 6 times per one cycle in the case of three phase, and 10 times per one cycle in the case of five phases and 14 times per one cycle in the case of seven phases and 2m times per one cycle in the case of m phases.

Figure 15:
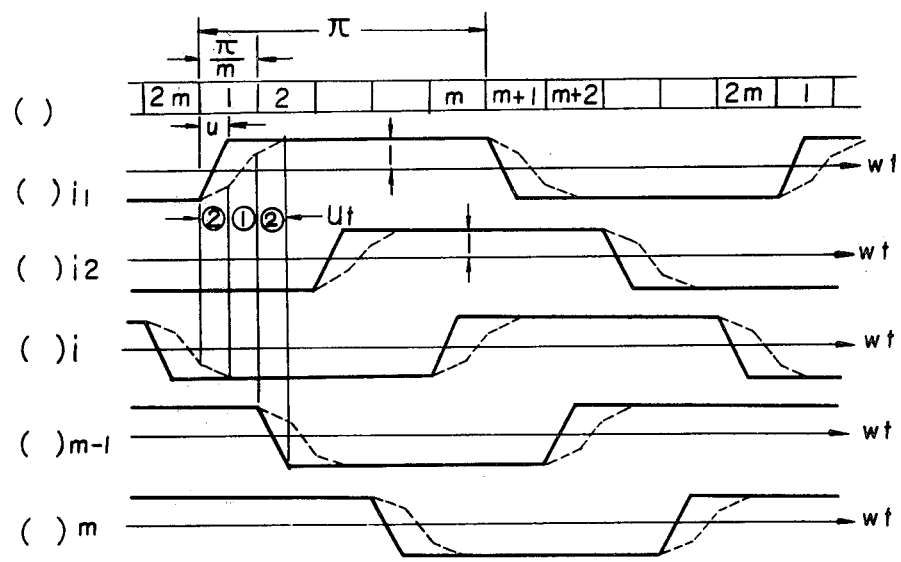
FIGS. 15 and 16 are respectively time charts of current waveforms.

FIG. 15 shows operation waveforms in the embodiment using the 5 phases armature windings (100A), wherein (i) shows the section numerals and (ii) to (vi) show the first phase current $i_1$ to the mth phase (fifth phase) current $i_m$. The full lines of the waveforms are given when the overlapping angle $U < \pi/m$. The dotted lines of the waveforms are given when the overlapping angle $U > \pi/m$. The time section ① commutating only one phase and the time section ② overlapping the commutations of the other phase are found. When the overlapping angle is increased, the overlapping of the commutations in the plural phases are increased. The torque pulsation of the motor is smaller depending upon the larger overlapping angle. When the commutation is carried out as a single phase as the embodiment, the overlapping angle is allowable for 180 degree in principle, whereby it is remarkably suitable for decreasing the torque pulsation by increasing the overlapping angle.

In the turn-on control method with phase difference, the phase difference is given for the turn-on control between the opposite side solid switches of the bridge connection. When the phase difference is $\pi/2m$ in the m phases, the commutation times is the 4m times per one cycle, that is two times of the former embodiment.

Figure 16:
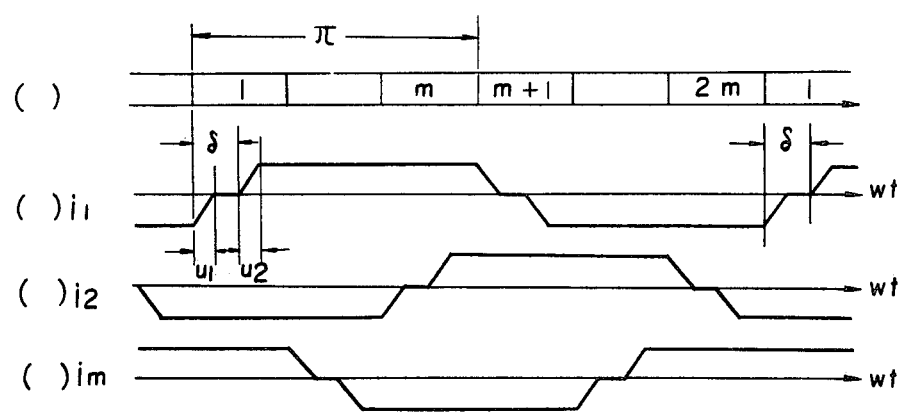

FIG. 16 shows the operation waveforms in the embodiment using the three phases armature windings (100B) wherein the reference (i) designates the section numerals; and (ii) to (iv) designate the first phase current $i_1$ to the mth phase (3 phases) current $i_m$.

In the first phase, the δ turn-on phase is given between the solid switches (3ap) and (3ān) and the δ turn-on phase is given between the solid switches (3an) and (3āp), the commutation is carried out after delay of the δ phase for the previous turn-on from zero of the winding current. In accordance with the embodiment, the commutation times can be double and the torque pulsation of the motor is remarkably decreased. In FIG. 16, the references $U_1$ and $U_2$ respectively designate overlapping angles.

FIG. 17(a) shows the distribution region of the conductor distributed sectional view of the AC windings in the embodiment using the seven phase armature windings (100 C).

In FIG. 17(a), the first phase windings (101) forms a coil or a coil group wherein the coil sides are distributed in the first layer conductor distributed region A (black band) and in the second layer conductor distributed region Ā (shade line band) departed for the electrical angle $\pi$. The distributed region width per one phase of the conductors is an electrical angle of $2\pi/m$. In the second phase windings to the m phase (seventh phase) windings, the coil sides are distributed in the first layer conductor distributed regions B to G and the second layer conductor distributed regions B̄ to Ḡ. The coil pitch of the coil is about $\pi$, at least more than $\pi/5$ whereby the generation of the even order (2nd, 4th, or 6th) space higher harmonic magnetic flux can be prevented.

In the embodiment, the distributed region width per one phase is $2\pi/m$. It can be $\pi/m$, wherein the conductors for one phase are separated to two groups and they are connected in series or in parallel.

In the case of $\pi/m$, the space higher harmonics can be eliminated by the even number phases windings because of the structure of two times of inner windings. On the other hand, in the case of $2\pi/m$, the space higher harmonics can be eliminated by adjusting the coil pitch for one phase to about electric angle $\pi$, whereby it is unnecessary to give two times of the phases and inner winding structure can be simple.

FIG. 17(b) shows expansion view of the AC windings. In FIG. 17(b) the full line coil side group is the first layer conductor group and the dotted line coil side group is the second layer conductor group and they are respectively buried in the upper or lower layer of the slots of the armature. When the coil lead X from the full line coil side is the inlet for the current, the coil lead X̄ for the dotted line coil side is the outlet for the current. The enlarged view of the coil lead is shown in the right circle. The coil leads X and X̄ of the adjacent coils are connected and the pair of the coil leads departed for the electrical angle $2\pi/m$ are connected to outer terminals (a, ā) to (m, m̄).

Figure 18:
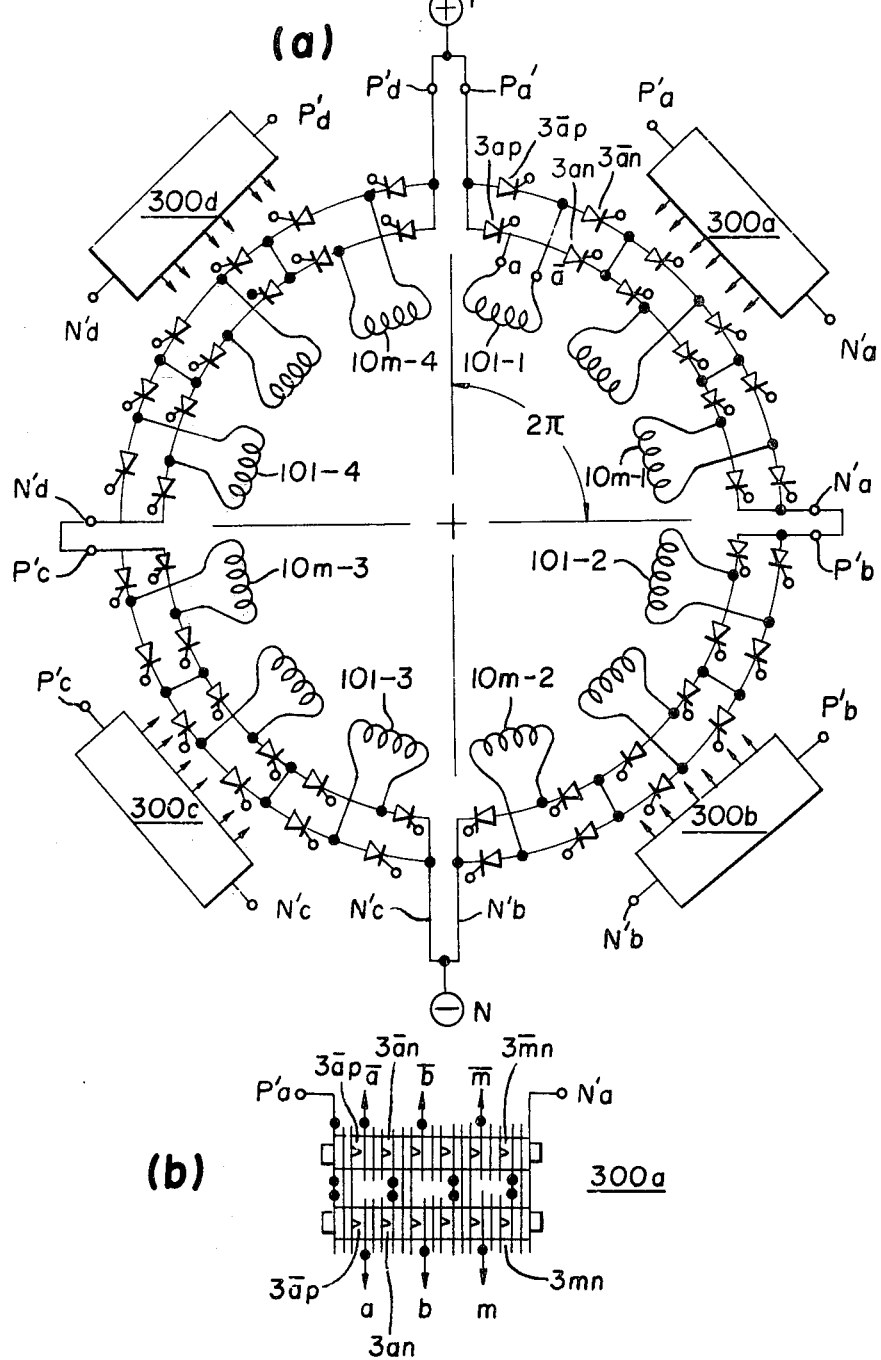
FIG. 18(a) is a schematic view for showing an arrangement in space peripheral direction.
FIG. 18(b) is a schematic view for illustrating the structure of the solid switch.

The coils for the electrical angle $2\pi$ are connected in parallel or in series for the pair numbers. The embodiment will be further illustrated below referring to FIG. 18. The wave winding method can be used instead of the lap winding method shown in FIG. 17(b). In the wave winding method, the outlet of the pair of the coils are connected to the inlets of the coils departed for the electrical angle of $2\pi$, and they are sequentially connected in series to the other pair of the coils so as to turn all peripheral part for the times of the slot numbers for each pole and each phase. The lead out is given by the same manner of FIG. 17(a).

The slot numbers for each pole and each phase are increased to reduce the slot ripple by providing $2\pi/m$ of the conductor distributed region width for winding for each phase.

The space higher harmonics can be reduced by providing less than $\pi/5$ of the coil pitch of the coils, moreover, the pulse numbers of the inner windings are equal to the phase numbers of the outer windings whereby the winding operation can be simplified.

The reference numerals (201), (202) of the rotor windings shown in FIG. 17(a) respectively designate the direct-axis field windings and the quadrature-axis field windings. The distribution of the coil conductors are shown. In the five phase or seven phase case, the distribution width $\theta_F$ of the direct-axis field windings (201) is substantially equal or slightly smaller than that of the quadrature-axis field windings whereby the effective torque generation region is expanded and the motor can be easily miniaturized.

FIG. 18(a) shows the arrangement in space peripheral direction wherein the expansion view of the AC windings are shown by circuit symbols. The four pole motor having three phase windings is shown. The windings ($101_{-1}$ to $10m_{-1}$) to ($101_{-4}$ to $10m_{-4}$) are disposed in the circumference distribution. The commutator circuits (300a), (300b), (300c) and (300d) are disposed in substantially circumference distribution so as to correspond to said circumference distribution of the windings. In the embodiment of the lap windings having $2\pi/m$ of the distributed region width per one phase, the connection blocks (groups or units) of the AC windings and the solid commutator circuits can be provided for the numbers of the pairs (4 pairs). In the $\pi/m$ lap winding method, the connection blocks for the numbers of pairs of poles or the numbers of poles can be provided. In the wave windings method, only one connection block can be provided.

The solid switches such as thyristor and power transistors can be arranged for two columns in series. The concept of the structure is shown in FIG. 18(b) as the embodiment of the solid commutator circuit (300a). In usual, the solid switches have a plane shape. The parallel connections require broad space, however, the series connections of the solid switches can be plied to be a compact form, and the solid commutator circuits can be easily arranged in the circumference distributions of the AC windings.

FIG. 18(b) shows the series connection of flapack solid switch elements which can be plied with insulation spacers and fitted on a plate, a strip or a bulk fin.

Certain modifications from the embodiment of FIG. 14(a) have been illustrated.

In FIG. 14(a), the other embodiment of the field (200) will be illustrated.

FIG. 19(a) shows a rotor used for the induction motor which comprises a cage type conductors (203) wherein the armature windings (100) are the primary stator windings.

FIG. 19(b) shows a rotor used for the wound rotor type induction motor wherein the primary windings (204 U), (204 V), (204 W) are provided and the AC windings connected to the solid commutator circuit (300) are the secondary windings.

When the solid switches ($3ap$) to ($3\overline{m}n$) have not self turn-off function and can not be commutated by the internal electromotive force as the thyristor, the bridge connections ($31a$) to ($31m$) can be formed in the circuit of FIG. 20 to provide the forcible commutation means such as the commutation capacitors ($33a$), ($33b$) or the series diode (34).

The embodiments of FIGS. 2 to 13 are different from the embodiments of FIGS. 14 to 20 on the electric width of the AC windings. Accordingly, when they are combined, the fundamental wave components for the different phases are included whereby the torque pulsation of a motor can be remarkably reduced because of many kinds of current phases and many kinds of phases of the windings.

In the embodiments of FIGS. 14 to 20, the solid switches can be semiconductor composite elements formed by combining a thyristor, a transistor, a gate turn-off thyristor and a diode.

The solid switches can be arranged so as to be suitable for the winding structure of the motor and used as the solid commutator circuit. Such space arrangement is optimum in an assemble to dispose in an outer frame adjacent to the coil ends of the AC windings of the motor.

The solid commutator circuits made of the series groups of the solid switches can be formed in compact groups and can be disposed on the side surface, the rear surface or the upper surface of the body of the motor or in an outer flame whereby they can be simple in the structure and the cooling system can be easily arranged and they can be easily disposed as a one piece with the motor.

In accordance with the embodiments of FIGS. 14 to 20, the solid commutation motor comprises a motor having m phase AC windings which are m groups of single phase AC windings and $2m = N \geq (2m+1)$ of the solid switches which are connected in series as the first series solid switch group and N of the solid switches which are connected in series as the second series solid switch group and a solid switch circuit connecting said switch groups in parallel and the AC winding for each phase being arranged and connected between the series contacts of the first series solid switch group and the series contacts of the second series solid switches whereby the input voltage can be increased and one piece structure of the motor can be easily attained.

FIG. 21(a) is a circuit diagram of the other embodiment of a single bridge inverter unit of the present invention wherein the reference numerals (101) to ($10m$) designate windings for each phase of the AC motor whose phase numbers are more than 4; ($31a$) to ($31m$) respectively designate single phase inverter units having 4 solid switches ($3ap$), ($3\overline{a}p$), ($3an$), ($3\overline{a}n$). This can be modified to the middle tap type single phase inverter unit having 2 of solid switches ($3a$), ($3a$) as shown in FIG. 21(c).

The solid switches can be a thyristor, a transistor, or the diodes ($3a'$), ($3b'$) which are connected in reverse parallel to a thyristor as shown by the broken line in FIG. 21(a).

The AC windings (101) to ($10m$) have phase differences as shown by the vectors of FIG. 21(b). When the phase numbers are m, the phase difference of $\pi/m$ or an integer times of $\pi/m$ between the adjacent phases. (In FIG. 21(b), the vectors $\phi_1$ to $\phi_m$ shown by the full lines). They can be the negative phase vectors $\phi_1'$, $\phi_2'$ to $\phi_m'$ shown by the dotted lines for each phase, since they can be equivalent by exchanging the polarity of the connection to the single phase inverter or exchanging the order of turn-on to cause the negative phase.

The embodiment of FIG. 21(a), the internal electromotive force commutation current type inverter, will be considered. In the single phase inverter the solid switches ($3ap$) and ($3\overline{a}n$) are simultaneously turned on and the solid switches ($3an$) and ($3\overline{a}p$) are simultaneously turned on and the solid switches ($3ap$) and ($3\overline{a}p$) and the solid switches ($3an$) and ($3\overline{a}n$) are turned on in the negative phase. It is also possible to provide phase difference $\delta$ for the phases initiating the turn-on of the solid switches in the opposite sides.

FIGS. 22(a) to (c) show current waveforms $i_1$ to $i_m$ for phases in the former relation of the initiation of turn-on. In FIGS. 22(a) to (c), when the overlapping angle $\overline{U}$ is larger, the torque pulsation is smaller. In the embodiment of FIG. 22, $\overline{U} \approx \pi/m$, the rotation of the composite rotating field formed by the AC windings is not stopped whereby the torque pulsation is small.

In the case of the voltage type single phase inverter, the output voltage mean value $\overline{V}$ can be formed in the trapezoidal waveforms shown in FIGS. 22(a) to (c) by certain control method wherein the polarity inversion time is sequentially prolonged as shown in FIG. 22(d).

In the single phase inverter unit, the pulse widths of both of half-waves allotted to each phase are respectively 180 degree ($\pi$) and the overlapping angle for each phase (electrical angle of the current or voltage polarity inversion transient time) is large whereby the torque pulsation can be reduced. When the inverter units (31a) to (31m) are connected in series as the embodiment of FIG. 21, high voltage and large capacity can be attained and the input electric pulsation can be small.

Figure 24:
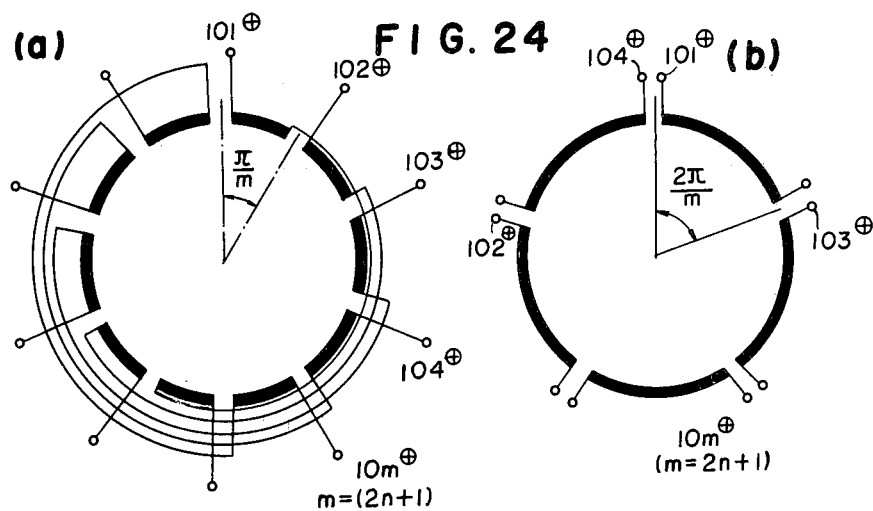

Referring to FIGS. 23 and 24, the other embodiments of the m phase AC winding method for the AC motor of the present invention will be illustrated.

FIG. 23(a) is a space distribution view shown as a sectional view of the AC winding conductors wherein the conductors are distributed in the slots formed on the inner peripheral part or on the outer peripheral part of the core or on the surface of the core. Sometimes, a core is not provided. In FIG. 23(a), the directions of the currents passed through the coil conductors for one phase are shown as the marks   and   . In one coil structure shown in FIG. 23(b), the full line part is disposed to the outer peripheral part and the dotted line part is disposed to the inner peripheral part. The embodiment has two layer windings wherein the return-part of the conductor (101) is shown as ($\overline{101'}$) and the return-part of the conductor ($\overline{101}$) is shown as (101').

In FIG. 24; the return-parts are departed with an electrical angle being smaller than the electrical angle of $\pi$ and it shows the two layer windings for a short pitch coil.

The coil group {(101), ($\overline{101'}$)} and {($\overline{101}$), (101')} which have the reverse phase each other are connected in reversely series to form the windings for one phase and for one pair of poles. The windings for one phase are always connected in series for pairs of poles. The other phases are the same conditions. The arrangement of the windings are shown only as the forward conductors for the first layer (101) to (10m) and ($\overline{101}$) to ($\overline{10m}$) and the distribution of the return conductors (101') to (10m') and ($\overline{101'}$) to ($\overline{10m'}$) are not shown in FIG. 23(c). In FIG. 23(c), the distributed region of the first layer conductors of the coil is shown by black belts. The width of the distribution of the conductors for one phase, that is the phase belt $\theta$ph is $\pi/m$ and the conductors in the reverse phase region are connected in series as the connection of the windings for each phase. When the references (101⊕) to (10m⊕) are defined as the positive terminals of the windings for each phase, the relations of the phases are shown in FIG. 21(b). In FIG. 23, even number phases such as 4 phases, 6 phases and 8 phases especially 4 phases are considered as the winding diagram. In FIG. 24, odd number phases such as 5 phases and 7 phases especially 5 phases are considered as the winding diagram.

In FIG. 24(a), the phase belt $\theta$ph is $\pi/m$ as the embodiment of FIG. 23 and the windings for one phase per one pair of poles are the pair of coils in the reverse phase. In FIG. 24(b), the phase belt $\theta$ph is $2\pi/m$.

The winding method of the phase belt $\theta$ph of $\pi/m$ is suitable for the case of the even number of phases or the small numbers of phases, whereas the winding method of the phase belt of $2\pi/m$ is suitable for the case of the large numbers of phases and the odd number of phases. When the multi-phase windings in the space distribution are wound in the AC motor and combined with the single phase inverter shown in FIG. 21, the current distribution of the coil conductors is smoothly rotated to impart high space utility.

FIG. 25(a) shows the current distribution in the AC winding conductor group having the phase belt $\theta$ph of $\pi/m$ in the embodiment of the present invention. The conductors for one phase are in the commutation (inversion of polarity) and the other conductors are in the stational peak value. When the inversion of the feed polarity of the phase is completed (see FIG. 22), the feed polarity of the adjacent phase is inverted. Thus, the smooth rotary current distribution is formed whereby the smooth rotated electromotive force is resulted and the smooth low torque pulsation can be obtained.

It is enough to commutate the conductors for only one phase whereby the conductors in the transient time are small and the numbers of conductors for effective output per unit space is large and the space utility is improved.

Figure 25:
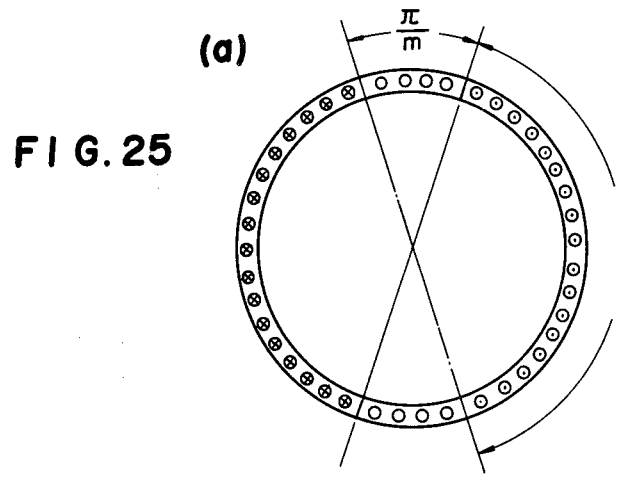
FIGS. 25($b_1$) and ($b_2$) are respectively a circuit diagram and a current distribution of the AC windings of the conventional apparatus.

On the other hand, FIG. 25($b_1$) shows the circuit diagram of the typical conventional apparatus wherein the commutation is carried out for the conductors for two phases whereby the conductor current distribution is given as FIG. 25($b_2$), which has the disadvantage of smaller ratio of the width of the distribution of the stationary coil conductors which are the most effective. Moreover, the rotary angles of the rotary electromotive force of the AC windings are fluctuated to cause large torque pulsation.

The embodiments can be applied for the armature of the synchronous motor; the secondary windings of the wound-rotor type induction motor (the secondary winding are preferably wound on the stator) and the primary windings of the induction motor in the motor apparatus feeding from the inverter to the AC windings. The embodiment is especially effective for improving the smoothness of the rotation and increasing the space utility in the apparatus forming the rotating field by the AC windings.

In accordance with the embodiment of FIGS. 21 to 25 of the present invention, the apparatus comprises the AC motor having the m phase AC windings (m is more than 4 and the phase difference is $\pi/m$ or an integer times of $\pi/m$) and the m groups of single all-wave inverter units (the operation in the m phases) and the AC windings being connected to the outputs of the inverter units for each phase whereby the torque pulsation of the AC motor is reduced.

What is claimed is:

1. In an AC feeding apparatus which comprises
   a plurality of series solid state switch groups connected in parallel;
   each series solid state switch group comprising N solid state switches connected in series;
   AC windings for n(n≧1) phase and m(m≧2) independent groups of windings which are respectively connected to corresponding contacts of series connections of solid state switches of the series solid state switch groups;
   an improvement characterized in that N numbers of the solid state switches in each group, and m groups of AC windings have the relation of $2m \geq N \geq (m+1)$ and
   at least two groups among m groups of the AC windings are sequentially excited with each phase difference $\Delta\theta(\neq\pi)$ in the turn-on control of the solid state switches by a turn-on control means, and at least one group of the AC windings is bypassed in the turn-on control of the solid state switches.

2. In a rotating field generator which comprises a plurality of series solid state switch groups connected in parallel which are connected to a DC power source;

each series solid state group comprising N solid state switches connected in series;

AC windings for $n(n \geq 1)$ phase and $m(m \geq 2)$ independent groups of windings which are respectively connected to corresponding contacts of series connections of solid state switches of the series solid state switch groups, an improvement characterized in that N numbers of the solid state switches in each group and m groups of AC windings have the relation of $2m \geq N \geq (m+1)$ and m groups of the AC windings are sequentially excited with a phase difference $\Delta\theta$ in the turn-on control of the solid state switches by a turn-on control means; and the conductors of the AC windings are arranged in sequential distribution in a substantially cylindrical space along the peripheral part thereof.

3. A rotating field generator according to claim 2 wherein the AC windings for n phases are disposed on the stator of an AC motor.

4. A rotating field generator according to claim 2 wherein the AC windings for n phases and m groups are wound on a stator of an AC motor and a rotor of the AC motor is arranged in the space of the rotating field formed by the conductors of the AC windings.

5. A rotating field generator according to claim 2 wherein the AC windings for n phases and m groups are primary windings which are wound on a stator to form the rotating field and said primary windings interacting with secondary multi-phase windings of second conductor groups that are arranged in the space of the rotating field whereby the current is fed through the secondary windings to an AC load.

* * * * *